Dec. 7, 1926.  
G. G. HASH  
GAUGE  
Filed April 23, 1926  
1,609,714
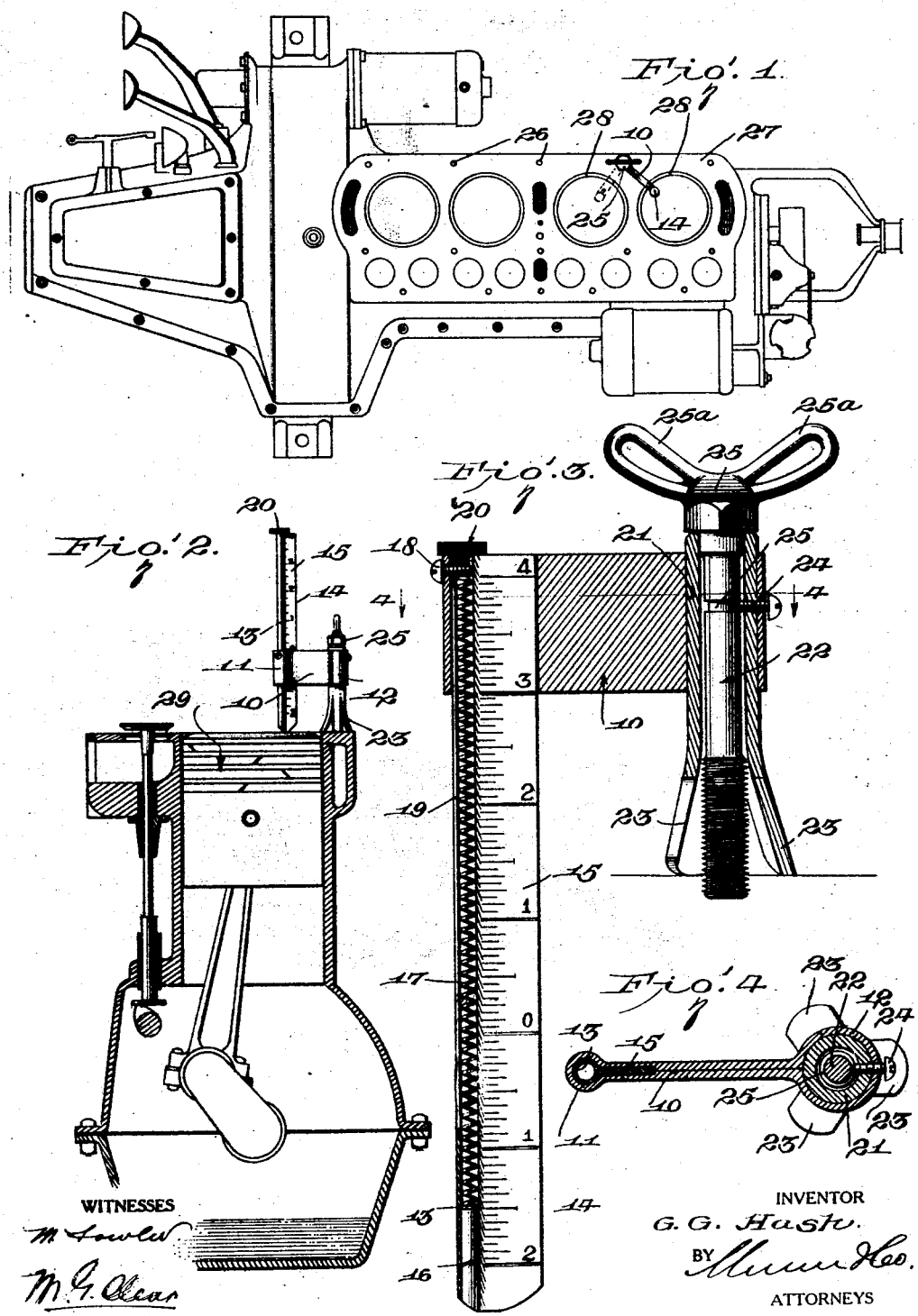
INVENTOR  
G. G. Hash.  
BY  
ATTORNEYS
WITNESSES Patented Dec. 7, 1926.

1,609,714

UNITED STATES PATENT OFFICE.

GADDIS G. HASH, OF MISSOULA, MONTANA.

GAUGE.

Application filed April 23, 1926. Serial No. 104,163.

My present invention relates generally to gauges, and more particularly to a gauge for determining the position of a piston relative to the cylinder in which it works, with the purpose in view of timing the valves accurately in accordance with the piston positions.

The primary object of my invention is the provision of a simple inexpensive gauge which may be effectively and efficiently used, and by means of which valve timing may be accomplished much quicker at a correspondingly reduced expense than that now required for the same operation.

A further object is the provision of a piston gauge for valve timing which may be utilized by those without special skill in valve timing operations, and which will be uniformly accurate and low in cost both in the first instance and in its up-keep.

A still further object is the provision of a piston gauge for valve timing which will be strong and durable.

In the accompanying drawing which illustrates my present invention and forms part of this specification:—

Figure 1 is a top plan view of the motor block of an engine illustrating the practical application of my invention;

Figure 2 is a vertical transverse section through the motor block of an engine, showing my invention applied as in use;

Figure 3 is a longitudinal section through my improved gauge, and,

Figure 4 is a horizontal section taken substantially on line 4—4 of Fig. 3.

Referring now to these figures, and particularly to Figures 3 and 4, I have shown a gauge of the type and for the purpose above set forth including a flat body 10 of sufficient width and thickness to insure strength and durability as well as permit of the proper functioning of its tubular end holders 11 and 12, the axes of which holders are at right angles to the longitudinal axis of the body.

The tubular holder 10 is adapted to slidably receive therethrough the tubular side edge 13 of a gauge generally indicated at 14, and a blade 15 of which extends in slidable relation through a groove of the body 10, adjoining its tubular holder 11. The blade 15 is, as particularly shown in Fig. 3, calibrated, preferably in inches and sixteenths of an inch with a zero point intermediate its ends so as to coincide with the upper edge of the body 10 when the lower end of the gauge 14 rests upon a piston whose upper surface is at that time flush with the upper surface of its cylinder block.

The lower end of the tubular side edge 13 of the gauge member is suitably closed as by means of a plug 16, and within this tubular side edge 13 a coil spring 17 is disposed with its lower end in engagement with the plug 16. Through the tubular holder 11 of the body 10 a set screw 18 is threaded, this set screw extending into the tubular side edge 13 of the gauge member through a slot 19 lengthwise of the tubular edge 13, the upper end of the spring 17 engaging this set screw 18. Thus the blade may freely slide in the holder 11 and slot of the body 10, although its movement in one direction will be resisted by the spring 17. The upper end of the tubular side edge 13 of the gauge is preferably closed by a knurled cap screw 20, by virtue of which the spring 17 may be easily withdrawn after the set screw 18 has been removed, in order that the parts may be easily cleaned from time to time.

The tubular holder 12 at the opposite end of the body 10 is substantially larger than the tubular holder 11 and receives and rigidly supports therethrough the tubular guide 21 of a mounting screw 22. This tubular guide 21 projects at its lower portion substantially beyond the lower end of the body 10 and has its lower end longitudinally split and flared to provide engaging feet 23, for a purpose which will be presently described.

The tubular holder 12 and the tubular guide 21 therein have threaded openings for the reception of a set screw 24 and the mounting screw 22 is provided intermediate its ends with an annular groove 25 into which the inner end of the set screw 24 loosely extends so as to prevent lengthwise movement of the clamping screw 22 relative to the guide 21 and the body 10 of the gauge. At its upper end the mounting screw 22 is preferably provided with a head 25 and diametrically outstanding wings 25' by virtue of which the screw may be easily manipulated. The lower end of the screw within and projecting slightly beyond the flared lower portion of the tubular guide 21, is threaded and the threads formed to enter and cooperate with the threads of the head bolt openings of a motor block.

Thus in the use of the gauge as proposed by my invention and as shown in Fig. 1, the lower end of the mounting screw 22 is turned into one of the head bolt openings 26 of a motor block 27, preferably an opening located near to and between adjacent piston cylinders 28. At the same time the inner end of the body 10 is positioned well over one of the piston cylinders so that the lower end of its gauge member 14 will extend into contact with the upper surface of the respective piston 29. The body 10 of the gauge is in this position held firmly and rigid by virtue of the upward pull of the mounting screw 21, creating downward pressure of the lower end of the tubular guide 21, or rather the lower ends of the feet 23 which are from the above flaring structure of the lower end of the guide thus adapted to contact with the upper surface of the cylinder block 27 around the head bolt opening which the mounting screw 22 enters.

As the crank shaft of the motor is turned, to raise and lower the piston 29 thereof, the gauge member 14 will follow such movement by virtue of its slidable support in the body and its controlling spring 17, and it is thus obvious that the positions of the piston at which the valves open and close may thus be readily determined and the valves adjusted accordingly.

Having in mind an automobile motor of well known construction, the position at which the exhaust valves open may be easily determined by lowering the piston until it is within $\tfrac{5}{16}$ths of an inch of its lowermost position. Similarly the proper point of closing of the exhaust valve may be determined by shifting the piston upwardly until its upper surface is $\tfrac{5}{16}$ths of an inch above the level of the upper face of the cylinder block 27. When the piston has been moved downwardly $\tfrac{1}{16}$th of an inch from its upper position, the intake valve should open and after the piston has moved upwardly from its lowermost position, $\tfrac{9}{16}$ths of an inch, the intake valve should close. These several positions of the piston may be easily determined by reason of the calibrated blade 15 of the gauge member 14 of my improved gauge, and when the valves of one cylinder have been adjusted to open and close at the proper points, in the movements of the respective piston, the mounting screw 22 may be loosened just sufficient to swing the body 10 of my improved gauge so as to shift the gauge member from one piston cylinder to the next adjacent piston cylinder, where the operation is repeated.

It is obvious that the gauge as proposed by my invention not only greatly simplifies the operation of valve timing, and materially reduces the time and expense of such operation, but that it provides a device which may be effectively and efficiently utilized without the necessity for special skill and experience in valve timing operations. It is also obvious my invention provides a gauge for use in valve timing which will be strong, and durable, which may be made economical in first cost, as well as upkeep, and which will effectively and efficiently perform the desired operations at all times.

I claim:—

1. A piston gauge for valve timing comprising an elongated body member having a tubular guide projecting at right angles thereto and at one end thereof, a mounting screw operating through said guide, and a spring controlled calibrated slide shiftable through the opposite end of the body at right angles thereto, as described.

2. A piston gauge for valve timing having a body, a mounting screw rotatable in one end of the body and adapted for engagement with and to support the gauge upon a motor block, and a calibrated gauge member bodily slidable in the direction of its length approximately at right angles to the gauge body at its opposite end, as described.

3. A piston gauge for valve timing including a body member having tubular holders at its opposite ends, a tubular guide member fixed within and through one of said holders and having one flared end projecting at one side of the body, a mounting screw extending through said guide, and having a threaded end within and projecting beyond the flared end of the guide, and a spring controlled calibrated slide movable through the tubular holder at the opposite end of the body.

4. A piston gauge for valve timing comprising a body having means adjacent to one end adapted to engage a motor block and securely support the body in connection therewith, and having a tubular guide at its opposite end, and a slot therethrough along the tubular guide, a gauge member having a blade movable in said slot, and one tubular edge shiftable in the said tubular holder of the body, the tubular edge of the gauge member having a longitudinal slot, and a closure member at one end of said slot, a set screw threaded through the tubular holder of the body and extending into the tubular edge of the gauge member through the slot of the latter, and a controlling spring in the tubular edge of the gauge member, one end of which abuts the said closure member and the other end of which engages the set screw, for the purpose set forth.

GADDIS G. HASH.